No. 646,081. Patented Mar. 27, 1900.
E. A. SPERRY.
GEARING FOR MOTOR VEHICLES.
(Application filed Aug. 19, 1898.)
(No Model.) 3 Sheets—Sheet 2.

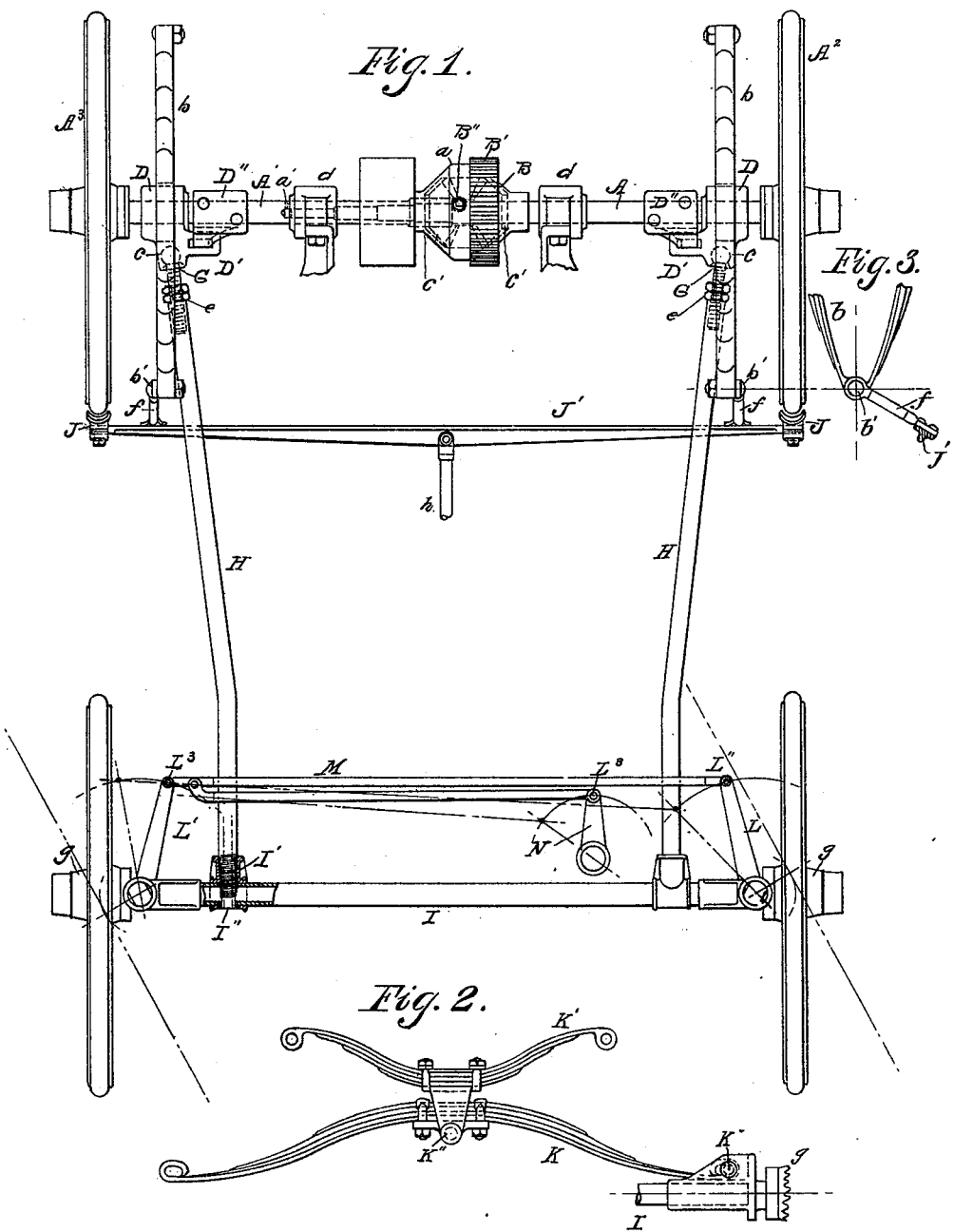

Witnesses:
Walter L. Upton.
O. G. Dorner

Inventor:
Elmer A. Sperry
Buckingham & Ewart
Attys.

No. 646,081. Patented Mar. 27, 1900.
E. A. SPERRY.
GEARING FOR MOTOR VEHICLES.
(Application filed Aug. 19, 1898.)
(No Model.) 3 Sheets—Sheet 3.

WITNESSES:
Budd Gray.
M. C. Prendergast.

INVENTOR
Elmer A. Sperry.
BY Buckingham & Ewart
ATTORNEYS.

THE NORRIS PETERS CO., PHOTO-LITHO., WASHINGTON, D. C.

UNITED STATES PATENT OFFICE.

ELMER A. SPERRY, OF CLEVELAND, OHIO, ASSIGNOR TO THE CLEVELAND MACHINE SCREW COMPANY, OF SAME PLACE.

GEARING FOR MOTOR-VEHICLES.

SPECIFICATION forming part of Letters Patent No. 646,081, dated March 27, 1900.

Application filed August 19, 1898. Serial No. 689,059. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Motor-Vehicle Gearing, of which the following is a specification.

My invention relates to motor-vehicles; and it consists in a novel arrangement of the running-gear and steering and motive gear in such vehicles, also means for adjusting one part with reference to the other, and other details and features, all of which are fully specified, shown, and claimed in the accompanying specification. These features are illustrated in accompanying drawings, in which—

Figure 4:
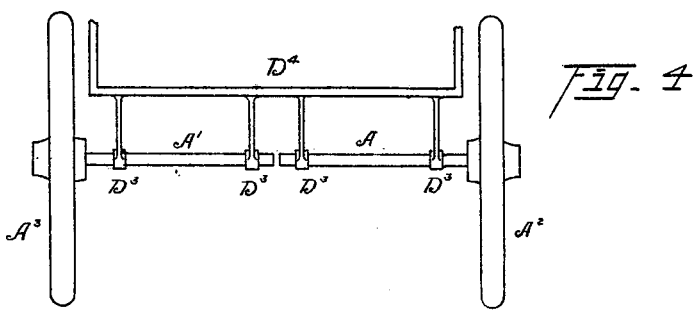
Figure 10:
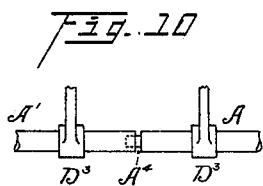
Figure 11:
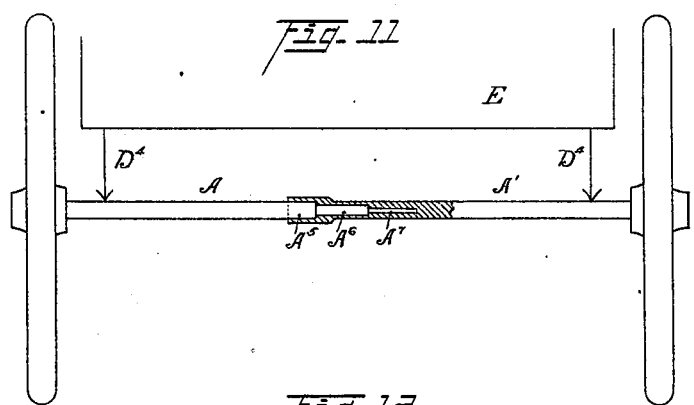
Figure 12:
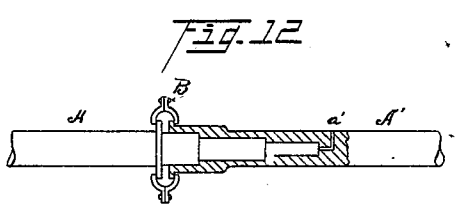
Figure 5:
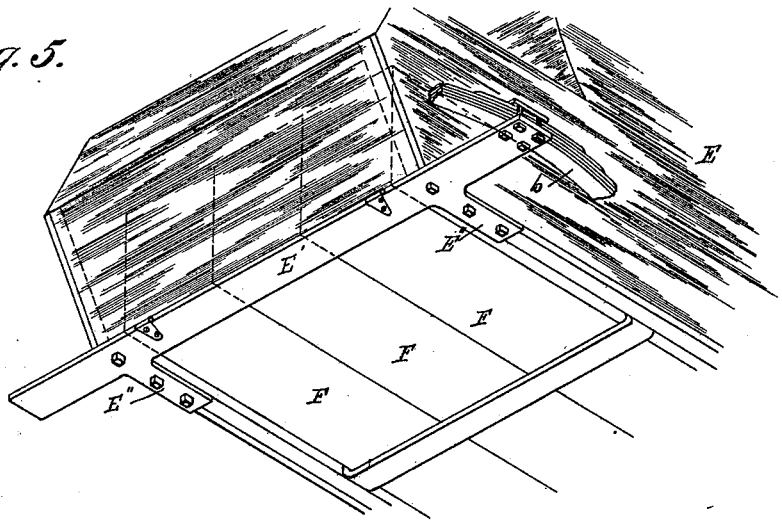
Figure 6:
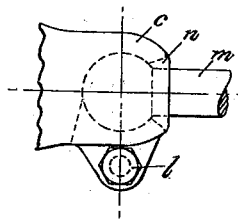
Figure 7:
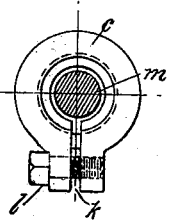
Figures 8, 9:
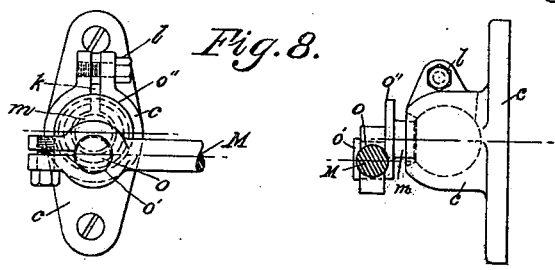

Figure 1 shows a plan view of the running-gear of the vehicle; Fig. 2, a detail of the forward spring; Fig. 3, a detail of the rear spring and brake-hanger. Fig. 4 is a diagrammatic view of one form of axle-mounting; Fig. 5, an isometrical view of the under portion of the rear of the vehicle-body, showing method of attaching springs, supporting batteries, &c. Figs. 6 and 7 are details of the ball-joints. Figs. 8 and 9 illustrate a method of adjustment employed in connection with the ball-joints. Fig. 10 is a detail showing alternate form of structure Fig. 4. Fig. 11 is a diagrammatic view of axle. Fig. 12 is a diagrammatic detail of alternate form of axle.

My motor-vehicle is constructed with running-gear, which may be described as follows: The rear axle, which I prefer to use as driving-axle, consists of two independent parts A and A', journaled together in a central region by a long journal extending from a point $a$ to a point $a'$, at which there is indicated a radial passage or hole, by means of which the journal is oiled. This journal consists of an extended male part A, which is provided with journal-faces of different diameters, as will be readily seen in the drawings, and which rest inside of the female journaled portion upon the part A', which is bored to fit, and which maintain the shaft in perfect alinement (indicated at $A^5$, $A^6$, and $A^7$) and render same self-supporting, so that the axes of the two parts A and A' are coincident even when heavily burdened. This taken in connection with the revolving separable housing B, which I prefer to construct of the divided webs of the driving-gear B', tends to coöperate with the collars C and C', which are secured to the respective shafts, and in this way prevents them from being drawn apart longitudinally, thus keeping the long journal-bearings intact. The collars C and C' preferably consist of the back faces of bevel-gears, which are present upon the axles to drive them and form a part of the familiar "jack-in-the-box" arrangement, giving independence of motion to each of the axles A and A' and to the connected driving-wheels $A^2$ and $A^3$. Between these faces and the faces of the housing B may be employed loose rings or friction-collars for the further elimination of the friction at these points. Upon this compound axle rest two or more journals, as at D D, upon which rest the springs $b$ $b$, which are preferably elliptical and are provided with joints, as $b'$, for the support of the body E, as seen in Fig. 5, at the ends of the cross-bar E', to which the hinges of the rear gate of the body are secured and which also have projections E'' E''', which run longitudinally under the body and for purpose of holding the same square and also at the same time, on which the batteries F F F rest.

The housing B contains oil, the filling-plug being seen at B''.

It will be seen that the female portion A' of the compound axle is enlarged at its journaled portion.

The bearings D are preferably roller or ball bearings and are provided with loops D' D', in which play the body-guiding pins D'' D'', which are preferably secured to the cross-piece E'. (Shown in Fig. 5.) These body-guiding pins play loosely within the loops D' for purpose of taking the well-known thrust in various directions, which would otherwise come upon the springs $b$. Other journals $d$ may be present upon the axle for supporting the motor mechanism proper, by means of which the gear B' is driven. Upon the journals D D are also lugs which receive the balls of the universal joint G, the envelop being preferably cast about the ball, as is also the case in Figs. 6, 7, and 8. These universal joints, however, form extensions to the reach-rods H H, and by means of which the forward axle may be adjusted with reference to the rear axle, as will readily be understood by the threads and nuts shown at $e$.

The forward parts of the reaches are secured firmly to the forward axle I by a braced connection, (shown at I',) the reach-rods preferably extending through the hollow axle and fitting into the forward portion, (seen at I'', Fig. 1.)

The brakes J J for the driving-wheels are preferably held by a beam J' and supported by the links $f f$, secured to the pivot $b'$ of the spring $b$, as shown in Fig. 3.

The forward portion of the body rests upon the springs K and K', which are preferably bowed, with their convex surfaces toward each other, and are connected by a pivot K'', constituting an oscillator for the body. The lower spring rests upon the forward axle I by a loose or lost-motion device (shown at $K^3$) at a point near the hubs $g$ $g$ of the forward wheels, so as to leave the main or center part of the axle comparatively free from strain and allowing the axle I to take the weight of the body as near as possible to the wheel itself.

The diagrammatic views comprising Figs. 4, 10, 11, and 12 are given to show the relation of the present invention (illustrated in Figs. 11 and 12) to the former state of the art. (Represented by Figs. 4 and 10.) For this purpose the drive-wheels $A^2$ and $A^3$ are shown as coupled to separate axles A and A' and journaled in journals $D^3$ $D^3$ $D^3$ $D^3$, the journals being held in line by a common portion $D^4$, to which they are attached. In Fig. 10 the axles A and A' are present, journaled as in Fig. 4; but here a small tenon $A^4$ is shown at the joint.

In Fig. 11 the carriage body or frame, constituting the superstructure borne by the axle, is indicated at E, and the points at which it rests upon the compound axle A and A' are indicated by the arrows $D^4$. The compound axle here is shown as self-supporting between the joints $D^4$ $D^4$ by the elongated socket and tenon-joint $A^5$ referred to above. (Shown in section.) This elongated joint is shown as consisting of a socket turned with three gradually-increasing diameters, (indicated at $A^7$, $A^6$, and $A^5$,) to which are fitted the three corresponding portions of the tenon.

In Fig. 12 the separable housing B is illustrated diagrammatically, consisting in this case of a device for preventing the separation of the elements A and A'.

Owing to the fact that the body and other parts rest upon springs and that parts to which they are connected are rigid with the axle, universal connections become necessary, and I prefer to make these from ball-joints, such as are illustrated in Figs. 1, 6, 7, and 8. Those shown in the latter three figures are rendered adjustable for wear by being slit at point $k$ and are provided with screw or equivalent means (shown at $l$) for closing or adjusting the slit. The envelops $c$ of the balls are preferably cast about the ball proper and the slit is formed by proper construction of the mold. The ball is provided with a neck $m$, by means of which it sustains its proper connection to the other parts. This neck is smaller than the ball and the cast aperture $n$, through which it passes, is larger than the neck $m$, but smaller than the ball. For purpose, again, of adjustment of the relation of the connected parts—for instance, for connecting the arm L to the arm L', by means of which the forward wheels are directed—a ball similar to the one shown in Figs. 6 and 7 is used at point L''; but at points $L^3$ a ball with an eccentric connection beyond its neck (shown in Fig. 8) may be employed, the construction of which may be readily understood, as follows: The neck proper, $m$, extends from the ball and there receives a cylindrical connecting-lug $o$, which has its axis eccentric to the axis of the ball and neck $m$, and suitable means are employed for clamping this cylindrical lug in any desired position, so that the ball and neck $m$ stand in constant relation to the connection M, while the envelop $c$ rotates and swings upon the ball proper, as will be readily understood. The same adjustment may be employed upon the controlling lever-arm N, Fig. 1, at point $L^3$.

The use and operation of the various devices explained will be readily understood from the foregoing description, where the detailed operation of the several devices has been elaborated.

It will be observed that in the structure of my compound axle herein described I do not employ any form of sleeve or other supporting-framework connected to the axle-supporting bearings to maintain the axle parts in alinement; but I depend solely upon the joint consisting of the elongated socket and tenon, located about centrally between the wheels, for the maintenance of this alinement and for sustaining the weight of the gearing or other parts which may be carried by the central part of the axle.

It will readily be understood that while it is designed to use the above parts in the relation shown, yet some may be used without the others and the invention extends to such use. It will, furthermore, be readily understood that the construction and arrangement may be varied without departing from the spirit of the invention.

Having thus described my invention, what I claim, and desire to secure by Letters Patent, is—

1. An axle for a motor-vehicle, consisting of two independently-rotatable parts or elements, each supplied with a vehicle-wheel, a joint between the elements, consisting of an elongated socket and tenon, located between the wheels, and a single bearing for supporting the superstructure upon each element located near the wheel and between it and the joint.

2. An axle for a motor-vehicle consisting of two independently-rotatable parts or elements each supplied with a vehicle-wheel, a joint between the elements, consisting of an elongated socket and tenon, located between the wheels, a single bearing for supporting the superstructure upon each element located between the wheel and the joint, and a spring between the journal and the superstructure.

3. A driving-axle for a motor-vehicle, consisting of two independently-rotatable parts or elements, each supplied with a driving-wheel, a source or sources of power, power-transmitting connections from the source or sources to the elements, a joint between the elements, consisting of an elongated socket and tenon located between the wheels, a single bearing for supporting the superstructure, upon each element located between the wheels and the joint, whereby a divided driving-axle is rendered sufficiently rigid to sustain alinement.

4. In a motor-vehicle, an underframe and running-gear, comprising two axles, suitably connected, one of the axles constituting the driving-axle of the vehicle, same being compound and consisting of two independently-rotating elements secured each to a driving-wheel, a source or sources of power, power-transmitting connections from the source to the elements, means consisting of an elongated socket within one element and a coöperating tenon extending from the other element of the compound axle, for rendering the axle self-supporting, journals upon the compound axle for supporting the superstructure, and an attachment between the journals and the connection, the said journals being located between the wheels and the socket and tenon, substantially as specified.

5. In a motor-vehicle, an underframe and running-gear, comprising two axles, connections between the axles, one of the axles constituting the driving-axle of the vehicle, same being compound and consisting of two independently-rotating elements secured each to a driving-wheel, a source or sources of power, power-transmitting connections from the source to the elements, means consisting of an elongated socket within one element and a coöperating tenon extending from the other element of the compound axle, for rendering the axle self-supporting, a single journal for each element of the compound axle for supporting the superstructure, and an attachment between the journal and the connection, the said journals being located between the wheels and the socket and tenon, substantially as specified.

6. A driving-axle for a motor-vehicle, consisting of two independently-rotatable parts or elements, each supplied with a driving-wheel, a source or sources of power, power-transmitting connections from the source or sources to the elements, a joint between the elements, consisting of an elongated socket and tenon, located between the wheels, whereby the divided driving-axle is rendered self-alining, in combination with a supporting means between the source or sources and the axle, consisting of a single journal for each element of the axle located between each wheel and the joint.

7. An axle for a motor-vehicle consisting of two independently-rotatable parts or elements each supplied with a vehicle-wheel, a joint between the elements, consisting of an elongated socket and tenon, located between the wheels, a single bearing for supporting the superstructure upon each element located between the wheel and the joint, in combination with means for securing the elements longitudinally.

8. An axle for a motor-vehicle, consisting of two independently-rotatable parts or elements each supplied with a vehicle-wheel, a joint between the elements, consisting of an elongated socket and tenon, located between the wheels, a single bearing for supporting the superstructure upon each element located between the wheel and the joint, in combination with a gear upon each of the elements and a power connection between them.

9. An axle for a motor-vehicle, consisting of two independently-rotatable parts or elements each supplied with a vehicle-wheel, a joint between the elements, consisting of an elongated socket and tenon, located between the wheels, a single bearing for supporting the superstructure upon each element located between the wheel and the joint, a gear upon each of the elements, a power connection between them, in combination with a housing or casing for the gears, in the form of a bonnet extending to the opposite faces of the gears and a gear upon the housing.

10. An axle for a motor-vehicle, consisting of two independently-rotatable parts or elements each supplied with a vehicle-wheel, a joint between the elements, consisting of an elongated socket and tenon, located between the wheels, a single bearing for supporting the superstructure upon each element located between the wheel and the joint, in combination with the gear upon each of the elements, a power connection between them, a housing or casing for the gears, and an attachment from the housing to a source of power.

11. In a vehicle, as an adjustment between the parts of the vehicle, a universal joint, consisting of a ball and case, a lug extending from the ball, which is eccentric thereto and a detachable connection between the lug and the connected vehicle part, substantially for the purpose specified.

12. In a motor-vehicle, a running-gear, consisting of a front axle, a rear axle, two reach-rods solid with the front axle and secured to the rear axle by universal joints in each rod between the axles.

13. In a motor-vehicle, a running-gear, consisting of a front axle, a rear axle, two reach-rods solid with the front axle and secured to the rear axle by universal joints.

14. In a motor-vehicle, a running-gear, consisting of a front axle, a rear axle, two reach-rods solid with the front axle and secured to the rear axle at widely-separated points.

15. In a motor-vehicle, a running-gear, consisting of a front axle, a rotating rear axle, two reach-rods solid with the front axle and secured to journals upon the rear axle by universal joints in each rod between the axles.

16. In a motor-vehicle, a running-gear, consisting of a front axle, a rotating rear axle, two reach-rods solid with the front axle and secured to journals upon the rear axle by universal joints in each rod between the axles and body-supporting springs resting upon the journals.

17. In a motor-vehicle, a running-gear, consisting of a front axle, a rear axle, two reach-rods solid with the front axle and secured to the rear axle by universal joints in each rod between the axles and means for adjusting the length of the rods.

18. In a motor-vehicle, a running-gear, consisting of a front axle, a rear axle, two reach-rods solid with the front axle and secured to the rear axle by universal joints in each rod between the axles and means for adjusting the length of the rods located between the rods and the universal joint.

19. In a vehicle, a universal joint, consisting of a ball, provided with means for securing it to its coöperating part of the structure, a neck connecting this portion with the ball proper, smaller than the ball and an inclosing envelop of metal cast upon the ball, leaving an aperture about the neck larger than the neck and smaller than the ball.

20. In a vehicle, a universal joint, consisting of a ball, provided with means for securing it to its coöperating part of the structure, a neck connecting this portion with the ball proper, smaller than the ball, an inclosing envelop of metal cast upon the ball, leaving an aperture about the neck, larger than the neck and smaller than the ball, the envelop being slit, and means for adjusting the width of the slit, substantially for the purpose specified.

21. In a motor-vehicle, a running-gear, consisting of a front axle, a rear axle, two reach-rods, solid with the front axle and secured to the rear axle by universal joints in each rod between the axles, a connection from the body to the rear axle and an oscillator between the body and the front axle.

22. In a motor-vehicle, a running-gear, consisting of a front axle, a rear axle, two reach-rods solid with the front axle and secured to the rear axle by universal joints in each rod between the axles and springs between the body and the front axle, resting upon such axle at or near its ends.

23. In a motor-vehicle, a running-gear, consisting of a front axle, a rear axle, two reach-rods solid with the front axle and secured to the rear axle by universal joints in each rod between the axles, springs between the body and the front axle resting upon such axle at or near its ends and a loose or lost-motion device between an end of the spring and the axle.

24. In a motor-vehicle, a running-gear, consisting of a front axle, a rear axle, two reach-rods solid with the front axle and secured to the rear axle by universal joints in each rod between the axles, two springs supporting the forward end of the body and an oscillating joint between the springs.

25. In a motor-vehicle, a running-gear, consisting of a front axle, a rear axle, two reach-rods solid with the front axle and secured to the rear axle by universal joints in each rod between the axles, two bowed springs with their convex sides facing each other, supporting the forward end of the body and an oscillating joint between the springs.

26. In a motor-vehicle, a vehicle-body, two driving-wheels, a compound axle, consisting of two independently-rotating elements, secured each to a wheel, journals upon the axle for supporting the vehicle-body, a socket-and-tenon joint located midway in the length of the axle, consisting of an extended male portion on one element, stepped in two or more different diameters, smaller toward the end and a corresponding socket within the other element, bored with different diameters, fitting two or more of the steps of the tenon, for purpose of rendering the axle self-supporting, substantially as specified.

27. In a motor-vehicle, a vehicle-body, two driving-wheels, a compound axle, consisting of two independently-rotating elements, secured each to a wheel, journals upon the axle for supporting the vehicle-body, a socket-and-tenon joint located midway in the length of the axle, consisting of an extended male portion on one element, stepped in two or more different diameters, smaller toward the end and a coöperating element, having an enlarged end, the enlarged end being bored with different diameters, fitting two or more of the steps of the tenon, for purpose of rendering the axle self-supporting, substantially as described.

28. In a motor-vehicle, a running-gear including an axle, a spring-seat upon the axle, a body, a guide upon the spring-seat, a pin protruding from body through the guide and a spring connecting the spring-seat to the body.

29. In a motor-vehicle, a vehicle-body, springs, a body-hanger, connected with the springs, passing across the body and provided with longitudinally-protruding arms, secured to the edges of the body, for the purposes specified.

30. In a vehicle, a ball-joint, consisting of ball and casing therefor, with a lug extending from the ball, the axis of which is eccentric to the axis of the ball and a connection for the lug.

31. In a vehicle, a ball-joint, consisting of ball and casing therefor, with a cylindrical lug extending from the ball, the axis of which is eccentric to the axis of the ball, a connection for the ball extending over the lug and means for clamping its cylindrical surface.

ELMER A. SPERRY.

Witnesses:
W. S. ROGERS,
M. C. PRENDERGAST.